July 13, 1943. S. J. G. PIRSON 2,324,107
METHOD FOR THE GEOCHEMICAL PROSPECTION OF HYDROCARBON DEPOSITS
Filed March 1, 1939
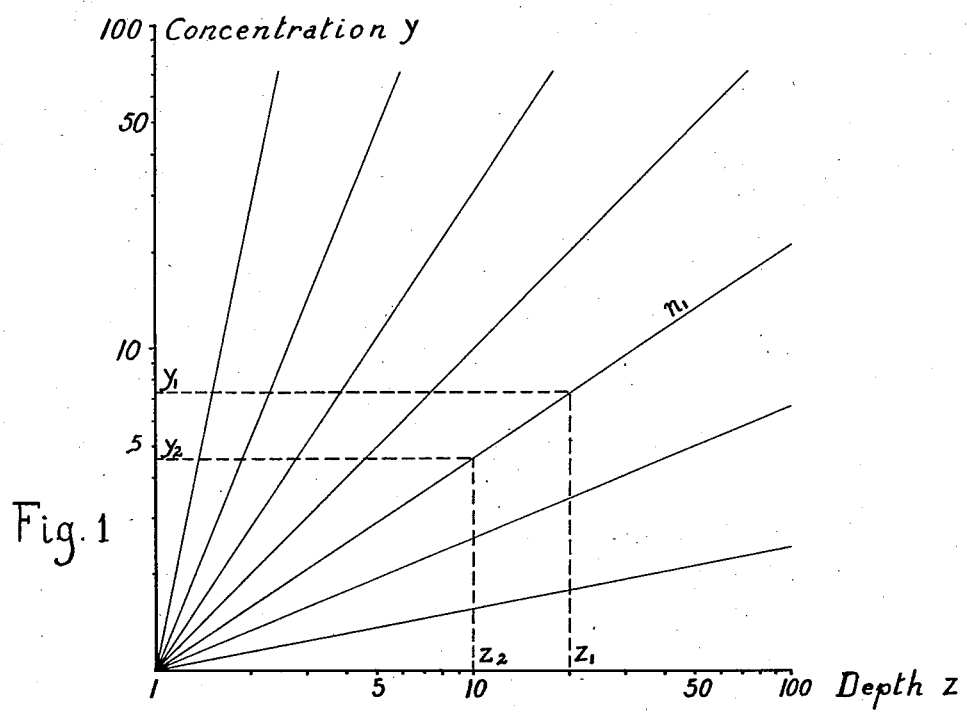
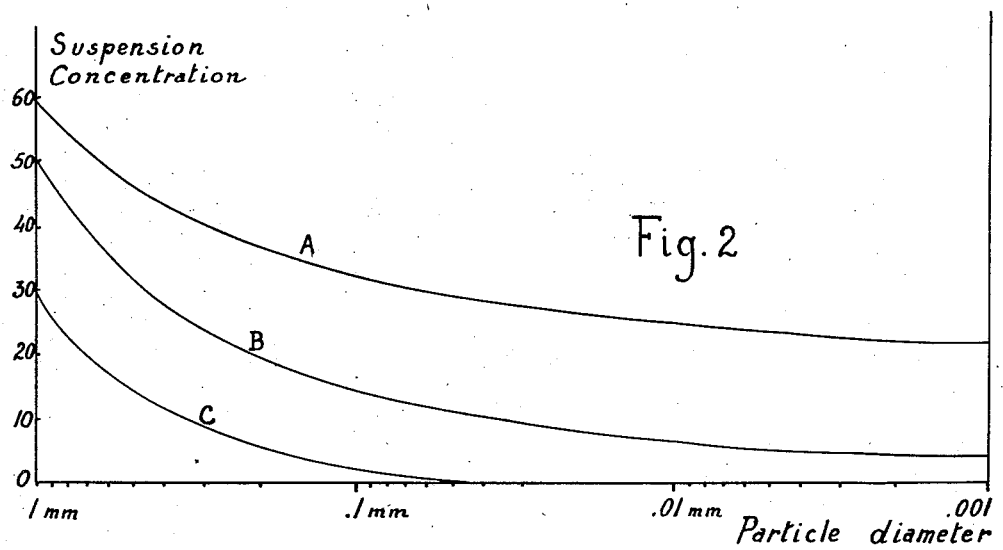

Patented July 13, 1943

2,324,107

UNITED STATES PATENT OFFICE 2,324,107

METHOD FOR THE GEOCHEMICAL PROSPECTION OF HYDROCARBON DEPOSITS

Sylvain J. G. Pirson, State College, Pa., assignor to Geochemical Service Corporation, a corporation of Oklahoma Application March 1, 1939, Serial No. 259,161

5 Claims. (Cl. 23—232)

This invention has reference to field and laboratory methods of treating samples of near surface geologic strata obtained from an area under test for the purpose of analysis for traces of hydrocarbons and with a view to determining the proximity of oil and/or gas accumulations. The present application is a continuation in part of my copending application Serial No. 198,460.

An object of my invention is to establish a definite field procedure for obtaining samples of geologic strata previous to their analysis in the laboratory so as to avoid numerous sources of errors.

Another object of my invention is to provide a method for correcting, in the laboratory, the results of the analyses, for certain causes of error which it is not possible to eliminate completely by the proper field sampling technique.

A further object of my invention is to provide a method whereby the results of the analyses in the laboratory will be corrected to a satisfactory base of comparison and whereby all extraneous sources of misinterpretation of the results of the survey are eliminated.

Further objects of the invention and novel features of the method will be apparent from the following specifications when considered together with the accompanying drawing in which:

Fig. 1 is a correction diagram for the variations of adsorbed hydrocarbon gas on the sample of geologic strata with depth and for material of variable adsorbing properties.

Fig. 2 is a correction diagram illustrating the size distribution of the particles of geologic strata and the relative total surface of the particles according to the relative amount of each size.

The present method of carrying out the art of prospecting for hydrocarbon deposits by the analysis of samples of geologic strata is closely related to the method described in my co-pending patent application here above identified in view of the fact that there exists at all times an equilibrium relationship between the amount of hydrocarbons adsorbed by the geologic strata and the ground gas concentration at the same depth, this is in view of the well known Freundlich relation which is as follows:

$$Y = KC^{\frac{1}{n}}$$

in which $Y$ is the quantity of a certain compound adsorbed on the surface of a measured quantity of adsorbing material.

$C$ is the concentration of that certain compound in the fluid medium in contact with the adsorbing material.

$K$ and $n$ are constants depending on the properties of both the adsorbing material and the adsorbed compound. In my previously disclosed method the concentration $C$ in the ground gas is measured whereas in the present application the quantity $Y$ per unit of weight is measured and consequently the results obtained by either method are similar to a relative degree without being strictly proportional to each other. It is possible to pass from the results of one method to those of the other by means of Freundlich's relation.

In withdrawing samples of geologic strata from a hole drilled into the surface of the earth, the field sampling technique necessary to carry out the geochemical prospecting method is considerably simplified and consequently the method is less expensive than the method of gas sampling. Complications and causes of errors are however introduced and the proper field and laboratory technique must be used in order to eliminate such errors.

I have recognized that the adsorptive properties of any material in the earth will vary with the following factors:

1. The temperature
2. The degree of humidity
3. The chemical composition
4. The degree of subdivision
5. The pressure
6. The depth of sampling.

If one desires to obtain results comparable on a common basis it is pertinent to use a sampling technique which will eliminate the source of errors as much as possible whereas for the factors the influence of which it is impossible to eliminate it is necessary to apply correcting factors.

The depth of sampling influences the hydrocarbon concentration in the strata due to the increase in concentration in the ground gas with increasing depths which is for practical purposes proportional to depth. By replacing the value of $C$ in Freundlich equation by $az$ where $a$ is a constant and $z$ the depth of sampling below the surface of the earth, Freundlich equation becomes:

$$Y = Ka^{\frac{1}{n}} z^{\frac{1}{n}} = A z^{\frac{1}{n}}$$

in which $A$ is a constant. This equation may now be graphed on logarithmic paper in the form of straight lines as represented in Fig. 1 on the ordinate of which is read the concentration $Y_1$ in the sample obtained from a measured depth $z_1$ and for a given value of the exponent $n_1$. Should the reference or datum depth of sampling have been chosen to be $z_2$, a concentration $Y_2$ should have been obtained. The remarkable feature of this correction diagram resides in the fact that the numerical values of the constants $n$ and $A$ do not need to be ascertained by any field or laboratory experiments. A series of fanlike radiating lines are drawn on a log-log coordinate paper the slope of which are the various values of the exponent $$\frac{1}{n}$$

Variations in atmospheric pressure due to meteorological conditions as well as variations in altitude of the surface of the earth will influence to a certain extent the results of the analysis of geologic strata samples taken at shallow depths. The percentage of error will however be rather small and may be neglected for practical purposes. For instance a variation in atmospheric pressure of twenty millimeters of mercury will produce at the most a possible error of 2.6 per cent which is well within the instrumental error of the analysis.

The temperature of the absorbing geologic strata has a large influence upon their retentive properties and too shallow a sampling would lead to erratic results due to the large variations in temperature to which the surface of the earth is submitted daily and yearly. It is well to obtain the samples for the purpose of hydrocarbon analysis at a depth where such temperature remains practically unchanged summer and winter. This depth may be from 10 to 20 feet in moderate climates and may be as deep as 50 feet in the colder climates.

Samples of geologic strata will retain very little adsorbed hydocarbon gases unless they contain a certain degree of humidity. Dry sand in particular does not retain any measurable quantities of such gases and consequently the method will not work in desertic territory unless a sufficiently deep sampling hole is drilled in order to reach the moist formations.

In moist strata, the percentages of hydrocarbons should be calculated on a dry basis in order to obtain comparable results. It is therefore necessary to correct the results for the degree of humidity of the samples in order to obtain consistent results over an area under test. The correction formula is as follows:

Corrected percentage by weight of hydrocarbon gases in the sample equal 100 times the percentage of hydrocarbon as analyzed on a wet basis divided by (100—percentage of humidity).

The chemical composition of the geologic strata is an important factor influencing their adsorptive properties. Usually in the prospective oil territories, the surface geologic strata are stratified and show little if any distortion. It is then possible to rely on the identity of the geologic strata from which the samples are withdrawn in order to eliminate the errors due to variations in their chemical composition. Assurance of the identity of the strata from which samples are withdrawn may be obtained from their inspection for lithological character but often their color will be a sufficient clue. It is also my preferred practice to measure the degree of acidity of the strata at various levels in the sampling bore hole and to withdraw the samples for analysis from levels in each bore hole where such degree of acidity is substantially equal to a predetermined value. By the combination of inspecting the geologic strata for lithology, color and degree of acidity, one may reasonably be certain that the chemical characteristics influencing the adsorbing power of the strata are substantially the same.

The degree of acidity of the geologic strata is known to influence particularly the adsorptive power of colloidal matters contained in such strata. Thus it is rational to take such samples at a depth where the variations in acidity are less likely to be pronounced and where the adsorptive power of the particles are favorably influenced. This is particularly true of the so-called zone B of the soil technologists (see: T. L. Lyon and H. O. Buckman—The Nature and Properties of Soils) which is more compact than the adjoining layers of soils as it contains more colloidal matter, is thicker and presents a fairly low degree of acidity (the so-called pH) which averages in the neighborhood of 4.5. A further advantage of collecting samples in zone B is due to the fact that it is normally present in all soils and possesses normally a fairly large thickness sufficient to obtain a sample of adequate size for the purpose of analysis. The depth at which this zone is encountered varies with the climatic regions as well as drainage and vegetation and it is necessary to experiment somewhat in the field with the aid of an hydrogen ion concentration meter before this zone may be recognized by an operator not versed in the science of soil technology. Soon however, where the region is fairly flat, the operator will recognize the zone by its color. In regions with steep topography it may be necessary to experiment at each test bore hole in order to find the depth at which samples of constant degree of acidity may be obtained. Sampling of geologic strata may not be confined for the purpose of geochemical prospecting to zone B but may be done also at a shallower or greater depths provided that the degree of acidity of the collected samples is substantially constant over the area under test. However, zone B offers a higher degree of retention for the hydrocarbon gases which are leaking out from the deposit sought for and consequently is the most advantageous geologic strata near the surface of the earth in which samples may be taken.

Next in importance among the factors affecting the adsorptive power of geologic strata near the surface of the earth is their degree of subdivision. The particle sizes of the samples from which large lumps and pebbles have been discarded will usually range from about one millimeter down to .001 millimeter and less. Considering equal weights of two samples of uniform particles size, one sample of average particle size of 1 mm. and the other sample of .001 mm. size, the exposed surface in the last sample is one thousand times larger than in the first case and a much larger quantity of hydrocarbon gases may then be adsorbed on the surface of the sample composed of small particles. This points out the importance of making a mechanical analysis of the samples in order to separate them in groups of average sizes. A rapid method of analysis suitable to give data necessary for the computation of corrections has been devised by Bouyoucos (Soil Science vol. 26, p. 233-38—1928) and provides for the separation of the sample in 3 groups: (1) sand; sizes: .077846 mm. to 2 mm., (2) silt: sizes: .077846 mm. to .02010 mm. and (3) colloidal matter; sizes: below 0.02010 mm. The average sand size is about 1 mm., for silt .05 mm., and for colloidal matter .005 mm. On this basis the following formula may be used for the correction for the degree of subdivision in order to reduce the measurements to a common basis:

Corrected percentage by weight of hydrocarbon gases in the sample equals 100 times the percentage of hydrocarbon as analyzed divided by (% sand × $1/100$ + % silt × $1/5$ + % colloids).

A more accurate method of making the correction for the degree of subdivision of geologic strata consists in plotting on semi-logarithmic coordinates respectively the concentrations in dispersed material remaining in suspension after certain periods of time according to Bouyoucos' method of mechanical analysis on the cartesian coordinate and the logarithm of the diameter of the particles on the point of settling at the end of such periods of time on the logarithmic coordinate and to evaluate the area determined by the curve so drawn between specified limits of size such as for instance 1 mm. and .001 mm. Fig. 2 illustrates by way of example cases which might occur according to the various samples of geologic strata which are withdrawn for the purpose of analysis for hydrocarbon traces. The curves marked A, B, C indicate respectively the curves so drawn for samples having for A a large exposed particle surface such as for claylike strata, B a medium exposed surface such as for silt like strata and C a small exposed surface such as for coarse sand. The area determined by the various curves A, B, or C, the two ordinates and the abscissa may be measured by means of various devices such as by a planimeter and the results of such measurements used as a relative correcting factor provided that all such diagrams as Fig. 2 for the various samples of a given survey are drawn to the same scale. Still a more accurate and yet faster method of making the correction for the degree of subdivision of geologic strata when analyzed for hydrocarbon traces consists in using a measured quantity of liquid of known concentration of a chemical which will be adsorbed by the particles of the strata in monomolecular layers. Knowing the size of the molecules so adsorbed and their quantity it is possible to calculate very accurately the surface of the particles exposed for adsorption. Chemicals which may be used for this purpose are for instance, naphtol-yellow, methyl-green, ponceau, acetone, etc. The procedure is as follows: The samples of strata after the analysis for hydrocarbon traces are thoroughly mixed with a measured solution of known concentration of one of the suitable chemicals, the mixture is thereafter filtered and the liquid recovered tested for its remaining concentration in the chemical used. The reduction in concentration is a measure of the adsorption power of the samples and the figures are used as relative correction factors. The measurement of concentration may be made very readily by means of various available known procedures such as colorimetry, conductometry, refractometry, radiometry and others.

After the above description of the difficulties involved in obtaining comparable results of analysis on a common basis in the geochemical method of prospecting for oil and gas accumulations in the earth my preferred procedure for carrying out the invention may now be described in the following terms:

The usual means of drilling shallow bore holes in the surface of the ground may be used in order to drill the test holes to depths varying from 10 feet to 50 feet more or less according to the climatic conditions in the area under test. The test holes should preferably be deep enough so that samples of constant temperature may be withdrawn. Samples from various depths are examined for their degree of acidity by means of a pH meter and for their lithologic character and color. Samples from each bore hole will be selected so that samples of substantially the same degree of acidity, color and lithologic character may be obtained from each test hole. The samples are placed in glass jar containers and closed by an air-tight cap, the location of the samples and their respective depth in each bore hole are recorded. A similar sampling procedure is repeated at other test holes distributed over the area under test. The samples are now taken to the laboratory for the analysis for their hydrocarbon gas content and the results are preferably recorded in weight fractions such as parts per billion. It is thus necessary to weigh the samples and their container. Samples are now dried at a temperature not exceeding 60° C. so as to avoid the destruction of the colloidal properties of the samples. The samples are weighed again and the percentage of moisture is determined. Corrections are now made for the moisture content as explained above. The samples are next tested for their degree of subdivision by one of the alternative methods outlined above and the correcting factor determined from the results of the degree of subdivision test. The results of the hydrocarbon analysis are further corrected for variation in the depth of sampling below the surface of the ground. After this series of steps are performed the results of the analyses for hydrocarbon traces are reduced to a common basis of comparison and the corrected results are plotted on a map of the area under test in order to permit interpretation in terms of possible oil and gas accumulations in the earth. Preferably the results are contoured in a fashion similar to a topographic or structural geologic map.

It is also my experience that the continuous escape of hydrocarbon gases from the accumulations of oil and/or gas in the earth affects the properties of the near surface geologic strata and mainly within a foot from the surface. In particular, the degree of acidity of the soil is considerably modified and by measuring this degree of acidity I have been able to relate the character of the near top soil to the geological structures containing oil and/or gas. The method consists in obtaining samples of geologic strata about one foot deep, such samples should be obtained from relatively undisturbed territories such as in woodlands, pasture lands, etc. The degree of acidity is then measured by means of a pH meter of which there are various models available. The degrees of acidity so measured are thereafter recorded on a map of the area under test in order to correlate with the subsurface oil and gas structures.

Although the present invention has been described in connection with the details of a specific method, it is not intended that these details shall be regarded as limitations upon the scope of the invention except in so far as included in the accompanying claims.

I claim:

1. A method of detecting the presence of hydrocarbon deposits in the earth comprising in combination the following series of steps: drilling a hole into the surface geologic strata at a plurality of locations over an area under test, measuring the degree of acidity of the geologic formations at a plurality of depths in each bore hole, withdrawing from each hole a sample of geologic strata having a degree of acidity substantially equal to a predetermined value, and analyzing quantitatively and qualitatively the samples so obtained for hydrocarbon constituents characteristically associated with the presence of the hydrocarbon deposits sought for whereby the hydrocarbon constituents determined in each sample may be correlated with the sample location in the area being prospected to provide data from which the location of hydrocarbon deposits can be determined.

2. The method of geochemically prospecting for oil and gas deposits consisting of selecting sample locations at spaced points over the area to be explored, taking samples from the geological strata at each location at different depths from ten to fifty feet depending upon the climatic conditions of the area under test, examining the samples to determine their degree of acidity, selecting samples from the respective locations of substantially the same degree of acidity, confining the selected samples, recording the locations from which the samples were selected respectively, analyzing the selected samples to determine the quantities by weight of hydrocarbon constituents thereof, correcting the determined content of hydrocarbon constituents in relation to moisture content, degree of particle subdivision and depth of strata from which the selected samples were taken, and reducing the analyses of the samples to a common basis whereby the hydrocarbon constituents determined in each sample may be correlated with the sample location in the area being prospected to provide data from which the location of hydrocarbon deposits can be determined.

3. A method for detecting the presence of hydrocarbon deposits in the earth, comprising drilling a hole into the surface geological strata at a plurality of locations over an area to be explored, withdrawing from each hole a plurality of samples at different depths, at least one sample being collected at each of the different depths, selecting from the respective holes samples having substantially the same degree of acidity, and quantitatively analyzing the samples so selected for leakage products characteristically associated with the presence of the hydrocarbon deposits sought for whereby the leakage products determined in each sample may be correlated with the sample location in the area being prospected to provide data from which the location of the hydrocarbon deposits can be determined.

4. The method according to claim 3 wherein in addition to the degree of acidity, the temperature, the degree of subdivision and the color of the samples of geologic strata withdrawn from each bore hole are selected so as to be substantially the same at each test location.

5. The method according to claim 3 wherein in addition to the degree of acidity, the degree of subdivision of the samples of geologic strata are selected so as to be substantially the same at each test location.

SYLVAIN J. G. PIRSON.